March 24, 1925.  1,531,258
W. KIESER
MEANS FOR REGULATING THE PRODUCTION OF SUPERHEATED STEAM
Filed June 5, 1924
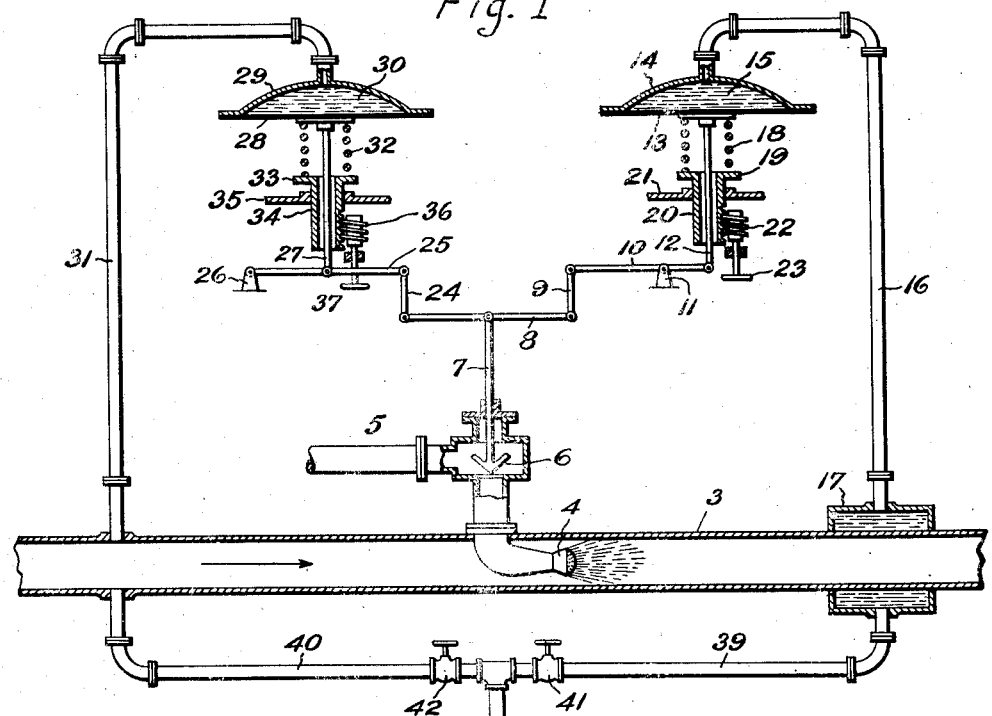
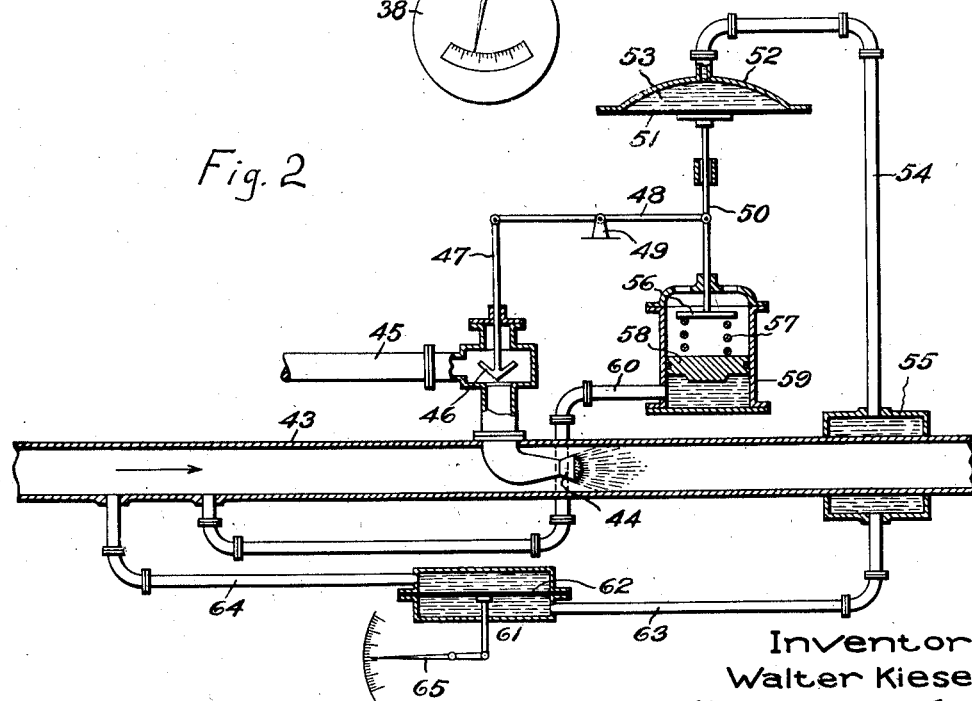
Inventor:
Walter Kieser;
by *[signature]*
His Attorney.

Patented Mar. 24, 1925.

1,531,258

UNITED STATES PATENT OFFICE.

WALTER KIESER, OF CHARLOTTENBURG, GERMANY, ASSIGNOR TO GENERAL ELECTRIC COMPANY, A CORPORATION OF NEW YORK.

MEANS FOR REGULATING THE PRODUCTION OF SUPERHEATED STEAM.

Application filed June 5, 1924. Serial No. 718,143.

*To all whom it may concern:*

Be it known that I, WALTER KIESER, a citizen of Switzerland, residing at Charlottenburg, Germany, have invented certain new and useful Improvements in Means for Regulating the Production of Superheated Steam, of which the following is a specification.

It is sometimes desirable to convert superheated steam flowing through a conduit, into saturated steam, and the object of the present invention is to provide automatic means for regulating the water supply so as to maintain the same degree of saturation with varying conditions of the superheated steam supply.

For a consideration of what I believe to be novel and my invention, attention is directed to the accompanying description and the claims appended thereto.

In the drawing, Fig. 1 is a diagrammatic view of apparatus embodying my invention, and Fig. 2 is a diagrammatic view of a modification.

Referring to the drawing, 3 indicates a conduit through which superheated steam is flowing, the direction of flow being indicated by the arrow, and 4 indicates a nozzle for discharging a fine spray of water into the steam to convert the superheated steam into saturated steam. The water is supplied from any suitable source through a conduit 5 and its flow to the nozzle is regulated by a valve 6.

Now, according to my invention, I place the regulating means for the water supply, which in the present instance is a valve, under the control of means responsive both to the pressure of the superheated steam and to the temperature of the saturated steam, the arrangement being such that when the pressure of the superheated steam increases the supply of water is decreased and when such pressure decreases the supply of water is increased, and that when the temperature of the saturated steam increases the supply of water is increased and when such temperature decreases the supply of water is decreased. By this means the water supply is regulated so as to maintain continuously the same degree of saturation of the steam.

In the arrangement shown in Fig. 1, valve 6 has its stem 7 connected to a floating lever 8. One end of lever 8 is connected by a link 9, lever 10 which is fulcrumed at 11, and rod 12 to the movable element 13 of a pressure responsive device 14. In the present instance element 13 is shown as being in the form of a diaphragm attached to which is a casing forming a chamber 15. Chamber 15 is connected by a pipe 16 to a casing 17 which surrounds conduit 3 on the down steam side of spray nozzle 4. Chamber 15, pipe 16 and casing 17 are filled with suitable expansible liquid such as water for example. By this arrangement it will be seen that the liquid in casing 17 is subjected to the temperature of the saturated steam, that is to the temperature of the steam flowing through conduit 3 after it has received water from the spray nozzle 4. Engaging the underside of the diaphragm 13 and opposing its downward movement is a spring 18 the lower end of which rests on a flange 19 carried by a sleeve 20. Sleeve 20 is mounted in a stationary guide 21 and is adapted to be moved vertically by a wheel 22 engaging teeth on the side of sleeve 20. Attached to the worm wheel is a handle 23. By turning handle 23 the tension of spring 18 can be adjusted. The other end of floating lever 8 is connected by a link 24, a lever 25 fulcrumed at 26, and a rod 27 to the movable element 28 of a second pressure responsive device. Element 28 is shown also as being in the form of a diaphragm attached to which is a casing 29 forming a chamber 30. Chamber 30 is connected by a pipe 31 to the interior of conduit 3 in advance of spray nozzle 4. Diaphragm 28 is thus subject to the pressure of the superheated steam. Engaging the underside of diaphragm 28 is a spring 32 which rests on a flange 33 carried by a sleeve 34. Sleeve 34 is mounted in a stationary guide 35 and is adapted to be adjusted vertically by a worm 36 to which is attached an operating handle 37. Chamber 30 is indicated as being filled with water since in operation this chamber becomes filled due to condensation of steam.

At 38 is indicated a pressure gauge connected by a pipe 39 to casing 17 and by pipe 40 to conduit 3 in advance of spray nozzle 4. In pipe 39 is a valve 41 and in pipe 40 is a valve 42. These valves are normally kept closed. However, by opening valve 41 the pressure in casing 17 and hence the temperature of the saturated steam will be indicated by the pressure gauge 38 while by opening valve 42 the pressure of the superheated steam will be indicated by the pressure gauge. By this means it is possible at any time to determine the relative values of the temperature of the saturated steam and the pressure of the superheated steam.

In operation the springs 18 and 32 are adjusted by means of the worms 22 and 36 so as to give the desired relation between the temperature of the saturated steam and the pressure of the superheated steam, the relation being adjusted by means of the pressure gauge 38. After the mechanism has been set it will be seen that whenever the pressure of the superheated steam increases diaphragm 28 will be actuated to effect a closing movement of valve 6 so as to decrease the supply of water to spray nozzle 4, while when the pressure of the superheated steam decreases, it will be actuated to increase the supply of water to spray nozzle 4. On the other hand, when the temperature of the saturated steam increases, the liquid in chamber 17 will expand and move diaphragm 13 in a direction to increase the supply of water to spray nozzle 4, while when such temperature decreases, diaphragm 13 will be operated to decrease the supply of water to spray nozzle 4. By this means, therefore, the apparatus takes into account changes in both the temperature of the saturated steam and the pressure of the superheated steam, and can be adjusted to maintain automatically a close regulation of the saturation of the superheated steam.

Referring to the modification in Fig. 2, 43 indicates the conduit through which the superheated steam flows, 44 indicates the spray nozzle, 45 the water supply pipe, and 46 the regulating valve for the water supply. In this arrangement valve 46 has a stem 47 connected to one end of a lever 48 fulcrumed at 49. The other end of lever 48 is connected to a rod 50. The upper end of rod 50 is connected to a diaphragm 51 which corresponds to the diaphragm 13, Fig. 1. Diaphragm 51 is connected to a wall 52 forming a chamber 53, and chamber 53 is connected by a pipe 54 to a casing 55 corresponding to the casing 17 of Fig. 1. Diaphragm 51 is thus subjected to a pressure which is proportional to the temperature of the saturated steam. The other end of rod 50 is connected to a plate 56 which rests on the upper end of a spring 57 supported on a piston 58. Piston 58 moves in a cylinder 59 the lower end of which is connected by a pipe 60 to conduit 43 in advance of spray nozzle 44. Piston 58 is thus subjected to the pressure of the superheated steam. 61 is a differential pressure gauge comprising a casing divided into two parts by diaphragm 62. On one side of the diaphragm, the casing is connected by a pipe 63 to casing 55. On the other side of the diaphragm the casing is connected by a pipe 64 to conduit 43 in advance of the spray nozzle. It will thus be seen that the indicating pointer 65 of the differential pressure gauge indicates the relation of the temperature of the saturated steam to the pressure of the superheated steam.

By the foregoing arrangement it will be seen that valve 46 is regulated in accordance with the temperature of the saturated steam and the pressure of the superheated steam in the same general manner as is the valve 6 in Fig. 1, the method of operation being obvious from the description already given.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a conduit through which superheated steam is adapted to flow, of means for supplying water to the conduit for changing the superheated steam to saturated steam, and means for regulating the supply of water in accordance with the pressure of the superheated steam and the temperatures of the saturated steam.

2. The combination with a conduit through which superheated steam is adapted to flow, of means for supplying water to the conduit for changing the superheated steam to saturated steam, a valve for regulating the supply of water, and means responsive to the pressure of the superheated steam and the temperature of the saturated steam for positioning said valve.

3. The combination of a conduit through which superheated steam flows, of means for spraying water into the conduit to saturate the steam, valve means for regulating the water supply, movable elements, one of which is moved in response to changes in the pressure of the superheated steam and the other of which is moved in response to changes in the temperature of the saturated steam, and means connecting said movable elements to the valve means for positioning it.

In witness whereof, I have hereunto set my hand this 12th day of May, 1924.

WALTER KIESER.